Feb. 16, 1971 W. F. VIEROW 3,563,863
METHOD OF ANODIZING SINTERED TANTALUM POWDER ANODES
Filed May 16, 1967
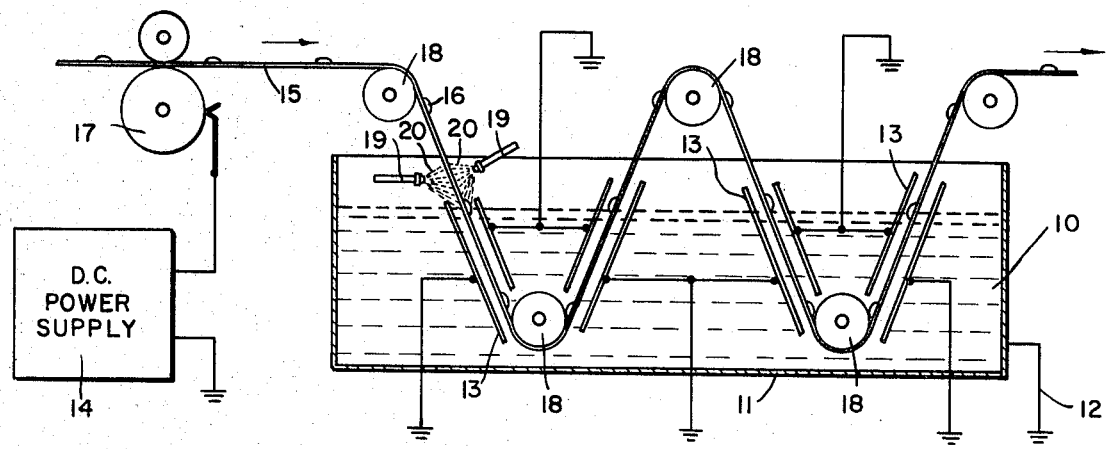
INVENTOR.
WILLIAM F. VIEROW
BY
ATTORNEY United States Patent Office
3,563,863
Patented Feb. 16, 1971

3,563,863
METHOD OF ANODIZING SINTERED TANTALUM POWDER ANODES
William F. Vierow, Carmel, Ind., assignor to P. R. Mallory & Co. Inc., Indianapolis, Ind., a corporation of Delaware
Filed May 16, 1967, Ser. No. 638,921
Int. Cl. C23b 5/58, 9/00
U.S. Cl. 204—28       4 Claims

ABSTRACT OF THE DISCLOSURE

A process for continuously anodizing tantalum foil and sintered powdered pellets formed on the foil wherein the foil passes through cathode plates immersed in an electrolyte bath and the full formation voltage is applied to the bath.

---

Solid tantalum electrolytic capacitors are being employed instead of commonly used aluminum capacitors for many applications for many reasons. One is the size advantage. Tantalum units having a given capacitance rating can be manufactured so as to be smaller than aluminum electrolytic capacitors having the same rating.

Among the many methods of forming such capacitors is that of depositing a tantalum powder on a tantalum foil and sintering the powder to form a solid pellet bonded to the foil. The foil and the pellet are then anodized to form a dielectric layer and a semiconductor coating and a conducting coating are then added to form a cathode. The foil and the pellet serve as an anode for the capacitor.

Prior to this invention, the anodizing step in the formation of the anode was done by still formation wherein the sintered pellet with the foil was immersed in a suitable electrolyte such as a bath of phosphoric acid. Using this technique, the current density of the electrolyte is decreased as the formation voltage is increased in order to prevent nucleation or breakdown of the anode. This method of anodization is slow, cumbersome and uneconomical.

The present invention is concerned with a method of continuously anodizing powder on foil tantalum anodes and has as one of its objects the provision of a method which is economical in time and money over that of conventional still formation techniques.

Another object of the invention is the provision of such a method wherein a foil having sintered powder pellets attached thereto is continuously fed through an electrolyte bath.

Another object of the invention is the provision of such a method wherein the foil with the pellets is fed through at least one pair of cathodes disposed in the electrolyte.

Still another object of the invention is the provision of such a method wherein the electrolyte bath is selected in accordance with the formation voltage needed to anodize the foil and the pellets.

Yet another object of the invention is the provision of such a method wherein the full formation voltage needed to anodize the foil and pellets is applied to the electrolyte bath.

Still another object of the invention is the provision of such a method wherein the foil is sprayed with deionized water as it enters the electrolyte bath.

Yet still another object of the invention is the provision of such a method wherein the foil with the pellets is immersed in the electrolyte a sufficient amount of time for the formation voltage to anodize the foil and the pellets.

With the above and other objects in view, which will appear as the description proceeds, this invention resides in a novel method of continuously anodizing power on foil tantalum anodes substantially as described herein and more particularly defined by the appended claims, it being understood that such changes in the precise embodiment of the invention here disclosed may be made as come within the scope of the claims.

In the drawings, the sole figure is a cross section of an electrolyte bath schematically showing apparatus for carrying out the method of the invention.

Generally speaking, the objects of the invention are accomplished by selecting and providing an electrolyte bath of proper electrical resistance, passing a tantalum foil having spaced sintered powdered tantalum pellets formed thereon through such bath, applying a full anodization voltage between the foil and spaced parallel plates immersed in the bath through which the foil passes, the foil with the pellets being immersed in the bath a sufficient amount of time to anodize the powder and foil when such formation voltage is applied. Preferably the tantalum strip with the tantalum powder is wetted with a forced deionized water spray as it enters the bath to prevent oxide striations and to reduce interface action.

While the invention will be primarily directed at the use of tantalum as the foil and pellets, it should be understood that in practicing the invention other film forming metals such as columbium, niobium and aluminum may be used.

Referring to the drawing, an electrolyte bath is held within a tank 11. The tank may be made from an electrically nonconducting material such as glass or it may be made of a metal such as stainless steel in which case the tank would be electrically grounded 12. Spaced parallel stainless steel plates 13 are substantially submerged and held within the bath, the plates being electrically connected in series from a suitable DC power supply 14 to act as cathodes. A tantalum foil or strip 15 carrying sintered powder tantalum pellets 16 formed thereon is electrically connected to power supply 14 through guide contact rollers 17, the foil acting as the anode. Thus the full anodization formation voltage can be applied between the foil 15 and plates 13. Such pellets are sintered onto the foil prior to reaching the present anodizing process. The tantalum foil, with the pellets, is guided through the cathode plates 13 by suitable guide rollers 18. As shown, there are four sets of cathode plates so that the foil 15 and the powder pellets 16 are anodized in passes. The number of such passes or sets of cathode plates would depend upon the time required to reach various voltage levels needed to anodize the pellets. The plates and the guide rollers may be completely submerged, and as another alternative, a long continuous set of cathode plates may be used. After being fully anodized the pellets pass on to the next manufacturing operation to complete the tantalum capacitor.

The process is carried out on the premise that full formation voltage will be applied to the electrolyte 10, the voltage being applied between the foil 15 and the plates 13. That is, the voltage necessary to complete anodization of the pellets 16 is applied to the electrolyte. Based on this method, the speed or the rate of the foil passing through the electrolyte determining the total immersion time, the electrolyte resistivity, and the total surface contact area of the pellets will determine the anodization current density. If the aforementioned factors are not controlled to some degree and the anodization current density becomes too great the anodes or pellets will break down, "grey out" or nucleate. On the other hand, if the current density becomes too low, the anodization time period will be lengthened excessively and the process will become uneconomical. Thus having once selected the formation voltage that is needed, the selection of the electrolyte, the spacing between the cathodes, and the immersion time are determined to give the best economical operation without causing the anode pellet to break down, "grey out" or nucleate.

During experimentations with the process of the invention, it was found that there was some tendency for oxide striations to appear on the foil 15 even though the operating variables appeared to be reasonably controlled. Such tendencies were eliminated by spraying the tantalum foil with the pellets with denionized water just as the foils enters the bath 10. This is done by spraying the foils through nozzles 19, the nozzles being positioned such that both sides of the foils are sprayed with a portion of the spray 20 penetrating the bath. Such wetting of the foil and the pellets increases the resistance of the bath in the vicinity where the foil enters the bath so as to get a reduced interface reaction.

In carrying out the process of the invention, the electrolyte is first chosen. With an electroyte having too low a resistivity the anodes will break down, "grey out," or nucleate, while if the resistance is too high the process becomes uneconomical. The range of resistivity is dependent upon the formation voltage needed to anodize the pellets and the tantalum foil. Table I shows the resistivity ranges for various formation voltages using a phosphoric acid ($H_3PO_4$)—water solution electrolyte commonly used in still formation of tantalum anodes.

TABLE I

| Formation voltage, volts | Electrolyte | Resistivity, ohms/cm. |
| --- | --- | --- |
| 0–100 | 1% $H_3PO_4$ | 60–62 |
| 100–200 | 0.2% $H_3PO_4$ | 180–220 |
| 200–300 | 0.01% $H_3PO_4$ | 1,400–1,600 |
| 300–500 | 0.001% $H_3PO_4$ | 10,000–12,000 |

The spacing between the cathodes 13 should be such that there is an even distribution of current between the plates. In general, the plates should be as close as possible without allowing the tantalum foil or the pellets 16 to touch the plates as the foil and the pellets are fed through the plates.

The size of the pellets 16 and the resistivity of the electrolyte basically determine the immersion time for a given finite section of the foil. Such correlation of the pellet size and the resistivity of the electrolyte controls, as previously noted, the anodization density so as to prevent anode breakdown. Table II presents immersion times in general for the formation voltages and the electrolytes of Table I for anode pellets 16 of from about 10 milligrams to about 4 grams in weight.

TABLE II

| Formation voltage, volts | Electrolyte | Resistivity, ohms/cm. | Immersion time, hrs. |
| --- | --- | --- | --- |
| 0–100 | 1% $H_3PO_4$ | 60–62 | 1–2 |
| 100–200 | 0.2% $H_3PO_4$ | 180–220 | 2–3 |
| 200–300 | 0.01% $H_3PO_4$ | 1,400–1,600 | 3–4 |
| 300–500 | 0.001% $H_3PO_4$ | 10,000–12,000 | 4–5 |

Table II sets forth immersion times which in general would be acceptable for anodization. However, in operation, for the larger anodes, say above .5 gram, an electrolyte and immersion time of the next higher formation voltage than the desired formation voltage would be used. For example, of the formation voltage needed is 150 volts and the anode pellets weighs 4 grams, then a 0.1% $H_3PO_4$ solution would be used as the electrolyte with an immersion time of 3–4 hours. While not desiring to be so limited, it is felt that this is due to the resistance gradient that occurs in the electrolyte as the temperature of the electrolyte in the center of the porous pellet increases, which accordingly requires a high resistance solution.

Using the process described and the apparatus shown, tantalum foils .0025 inch x ½ inch having sintered powdered tantalum pellets have been anodized at a 150 to 180 volt formation voltage using a 0.2% solution of $H_3PO_4$—200 ohm/cm. resistivity electrolyte. The cathode spacing was about 2 inches with the plates being parallel to each other. Deionized water was sprayed onto both sides of the tantalum foil as it entered the electrolyte bath, the spray extending from about 2 inches above the bath to about ¼ to ⅜ of an inch below its surface. The immersion time for any one finite section within the bath was about 2 hours.

From the foregoing description it will be apparent to those skilled in the art that this invention provides a new and useful process for continuously anodizing metal powder sintered on metal foils for solid metal capacitors. Accordingly, it is contemplated that the scope of the invention is to be determined from the claims appended hereto.

What is claimed is:

1. A process for continuously anodizing tantalum foil and sintered powdered tantalum pellets formed on the foil which comprises selecting and providing an electrolyte bath of proper resistance in accordance with the full formation voltage needed to anodize said foil and pellets, passing said foil and pellets through said bath, applying said full anodization voltage between said foil and spaced parallel plates immersed in said bath through which said foil and pellets passes, said foil and pellets being immersed in said bath a sufficient amount of time to anodize the powder and foil when such formation voltage is applied, said electrolyte and said foil immersion time being selected in accordance with the following table and the weight of said pellets is from about 10 milligrams to about 0.5 gram.

| Formation voltage, volts | Electrolyte | Resistivity, ohms/cm. | Immersion time, hrs. |
| --- | --- | --- | --- |
| 0–100 | 1% $H_3PO_4$ | 60–62 | 1–2 |
| 100–200 | 0.2% $H_3PO_4$ | 180–220 | 2–3 |
| 200–300 | 0.01% $H_3PO_4$ | 1,400–1,600 | 3–4 |
| 300–500 | 0.001% $H_3PO_4$ | 10,000–12,000 | 4–5 |

2. A process according to claim 1 wherein the selection of the electrolyte and the immersion time is adjusted for pellets greater than about 0.5 gram in weight by selecting the electrolyte and immersion time corresponding to the next higher in formation voltage than the required formation voltage.

3. A process for continuously anodizing tantalum foil and sintered powdered tantalum pellets formed on the foil which comprises providing a phosphoric acid electrolyte bath having a concentration of from about 0.001% to about 1% phosphoric acid having a resistivity from about 60 to about 12,000 ohms/cm., passing said foil and pellets through said bath, wetting said foil and pellets with at least one de-ionized water spray as said foil and pellets enter said bath with said spray penetrating into said bath, applying an anodization voltage up to about 500 volts between said foil and spaced parallel plates immersed in said bath through which said foil and pellets pass, said foil and pellets being immersed in said bath a sufficient amount of time to anodize the pellets and foil when such formation voltage is applied.

4. A process for continuously anodizing tantalum foil and sintered powdered tantalum pellets formed on the foil which comprises selecting and providing an electrolyte bath of proper resistance in accordance with the full formation voltage needed to anodize said foil and pellets, passing said foil and pellets through said bath, wetting said foil and pellets with at least one de-ionized water spray as said foil and pellets enter said bath with said spray penetrating into said bath, applying said full anodization voltage between said foil and spaced parallel plates immersed in said bath through which said foil and pellets pass, said foil and pellets being immersed in said bath a sufficient amount of time to anodize the powder and foil when such formation voltage is applied, said electrolyte being selected in accordance with said formation voltage as indicated by the following table.

| Formation voltage, volts | Electrolyte | Resistivity, ohms/cm. |
|---|---|---|
| 0–100 | 1% $H_3PO_4$ | 60–62 |
| 100–200 | 0.2% $H_3PO_4$ | 180–220 |
| 200–300 | 0.01% $H_3PO_4$ | 1,400–1,600 |
| 300–500 | 0.001% $H_3PO_4$ | 10,000–12,000 |

References Cited

UNITED STATES PATENTS

| 2,538,317 | 1/1951 | Mason et al. | 204—28 |
| 2,868,702 | 1/1959 | Brennan | 204—58 |
| 2,989,445 | 6/1961 | Lloyd et al. | 204—28 |
| 3,180,809 | 4/1965 | Gregori | 204—56 |

JOHN H. MACK, Primary Examiner

R. L. ANDREWS, Assistant Examiner

U.S. Cl. X.R.

204—56